(No Model.)
H. DAVIDSON.
MACHINE FOR CUTTING SCREW THREADS.
No. 437,580. Patented Sept. 30, 1890.
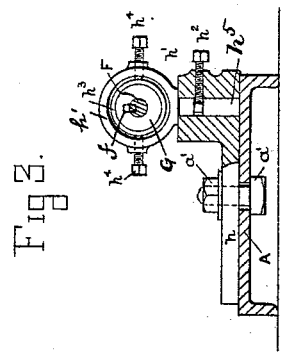
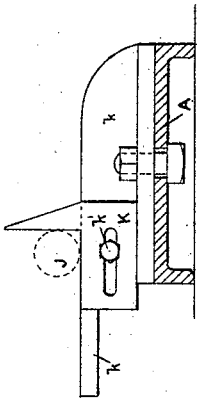
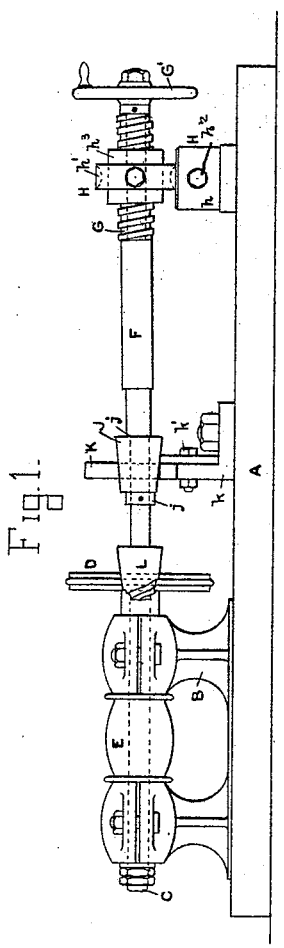
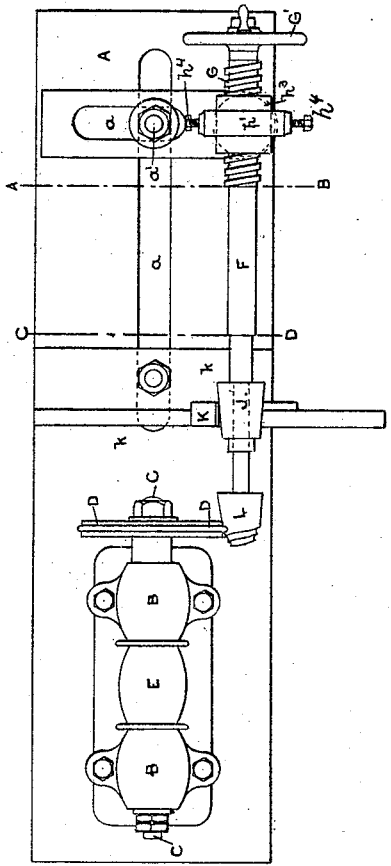
Witnesses
Chas. L. Sturtevant
N. N. Lamb
Inventor
Henry Davidson
By Atty.
Frankland Jannus

UNITED STATES PATENT OFFICE.

HENRY DAVIDSON, OF DALSTON, ASSIGNOR TO THE IMPROVED SCREW CORK COMPANY, LIMITED, OF LONDON, ENGLAND.

MACHINE FOR CUTTING SCREW-THREADS.

SPECIFICATION forming part of Letters Patent No. 437,580, dated September 30, 1890.

Application filed May 28, 1889. Serial No. 312,425. (No model.)

*To all whom it may concern:*

Be it known that I, HENRY DAVIDSON, a subject of the Queen of Great Britain, residing at Dalston, in the county of Middlesex, in the Kingdom of England, have invented certain new and useful Improvements in a Machine for Cutting Screw-Threads, of which the following is a specification.

The invention has for its object a machine for reproducing articles of a certain shape in a simple and expeditious manner. It is best described by aid of the accompanying drawings, in which—

Figure 1 is a front elevation of the machine; Fig. 2, a plan thereof; Fig. 3, a cross-section on line A B, Fig. 2, showing the construction of the universal joint; Fig. 4, a cross-section on the line C D, Fig. 2, showing the templet or model and the rest by means of which the axis of the mandrel is regulated as regards its proximity to the cutter.

In the drawings, A is the bed-plate or framing of the machine; B, the puppet-head containing a rapidly-rotating spindle C and cutter D. E is a pulley for driving the spindle and cutter aforesaid.

F is a mandrel, made to receive at one end a cylindrical sleeve G, having a screw-thread of suitable pitch cut thereon. This is secured by a feather $f$, or its equivalent, so that it rotates with the mandrel aforesaid. The screw G can easily be removed, so as to substitute when required a screw of coarser or finer pitch.

The screw G is supported so as to allow the mandrel F freedom of movement in all directions within certain limits. The mechanism, as a whole, by which the said parts are supported I call a "universal joint," as it is such to all intents and purposes, and have marked it H in the drawings. This part or joint H comprises a holder or standard $h$, mounted upon the bed-plate, and adjustable thereon by means of the slots $a\ a$ and bolt and nut $a'$. The ring $h'$, in which the screw G is supported, is provided with a shank $h^5$, fitting a socket in the holder $h$, in which it is capable of free rotation. This shank $h^5$ is provided with a groove, which is engaged by a set-screw $h^2$, passing through the side of said holder, thereby preventing vertical displacement of the shank. While the purpose of this set-screw is mainly to prevent vertical displacement of the shank by fitting the groove formed therein, it will be obvious that it may be desirable in some instances—as, for example, if a number of stoppers of equal size are to be made—to clamp the same against rotation, thereby preventing the swinging movement of the mandrel F, and this can be done by tightening the screw $h^2$ against the shank.

A screwed nut $h^3$, having a pitch equivalent to the screw G, is pivoted in the joint H by the set-screws $h^4$ and receives the said screw.

G' is a handle for rotating the mandrel F. The other end of the mandrel F carries a model or form J of any suitable shape, and it is supported on the model-rest K.

$k$ is an angle-plate mounted on the bed-plate A, to which the model-rest aforesaid is secured.

The article or blank L which it is desired to operate upon is attached to the end of the mandrel, and its proximity to the cutter D is regulated by the rest K, which can be moved back or forth by loosening the nut $k'$. The end of the mandrel might, for example, be screwed, so as to facilitate the attachment of the blank.

In Figs. 1 and 2, L is the article or blank which is being operated upon, and is intended to represent a cork or stopper for bottles, upon which a screw-thread is being cut. I wish it, however, to be understood that the stopper aforesaid is only an illustration of what the machine is capable of performing.

The mode of action of the apparatus is as follows: The model whose shape it is desired to duplicate is placed on the mandrel F and secured in position by the collars $j$. The blank to be operated upon is then secured to the end of the mandrel aforesaid. The rest K is adjusted to bring the blank in close proximity to the revolving cutter D. This cutter is of the shape shown for cutting a thread; but if used for cutting blanks should have a beveled straight-edge. A screw and nut of suitable pitch are placed on the end of the mandrel F, which is adapted to receive them, and the latter is engaged by the ring $h'$ of the universal joint. The mandrel aforesaid is rotated by the handle G'. When the handle G' is turned, the mandrel F, model J, and the blank are rotated, and are moved slowly forward by the screw G. The universal joint H allows the mandrel F sufficient freedom of motion, so that the outline of the model, in conjunction with the rest K, guides the blank against the rotating cutter D and reproduces a duplicate of the model. The model J is pressed against the rest K while the blank is being operated upon by the cutter either by the hand or by any suitable device. If a screw-thread is to be cut upon the blank L, a screw G and nut $h^3$ are employed, having a pitch equivalent to the screw-thread it is desired to cut. When the handle G' is rotated and the blank L pressed against the rotating cutter, a spiral thread is formed upon the blank L. The outline of the model can be reproduced and the screw-thread cut on the blank at one operation if the cutting-edge of the cutter D is made of a suitable shape—such as that shown on the drawings. The mandrel F can of course be power-driven, if desired, instead of being rotated by hand.

In some cases the screw G might be dispensed with and the mandrel F, supported by a plain collar or sleeve, pivoted in the gimbal $h'$.

I declare that what I claim is—

1. In a machine for cutting screw-threads, the combination, with a suitable cutter and means for revolving the same, of a rotatable mandrel, a screw-threaded sleeve surrounding one end of said mandrel and removably secured thereto, said screw-sleeve being mounted in a longitudinally and laterally adjustable bearing, substantially as described.

2. In a machine for cutting screw-threads, the combination, with a suitable cutter and means for revolving the same, and a rotatable mandrel mounted at one end in a laterally and longitudinally-adjustable bearing and carrying near its opposite end a model of the article to be cut, of a model-rest adjustable laterally on the bed of the machine.

3. In a machine for cutting screw-threads, a suitable cutter and means for revolving the same, a rotatable mandrel, a screw-threaded sleeve surrounding one end of said mandrel and removably secured thereto, said screw-sleeve being mounted in an adjustable bearing, a model mounted near the opposite end of said mandrel, and a model-rest laterally adjustable on the bed of the machine, substantially as described.

4. In a cutting-machine, the combination of the spindle F, feed device G G', bearing $h^3$, ring $h'$ supporting the same, and pivot $h^5$, substantially as described.

5. In combination with the rotatable and longitudinally movable mandrel F, a holder in which said mandrel is so mounted as to be capable of horizontal adjustment, a templet upon said mandrel, and a rapidly-revolving cutter, as D, mounted in stationary bearings, substantially as described.

6. The combination, in a cutting-machine, of the standard and bearing H, laterally adjustable, and the rest K, also adjustable laterally, with the spindle F and the cutter D, substantially as described.

7. A cutting-machine consisting of the combination of a pivoted mandrel F, a rest K, a model J, resting against that rest, a screw forward feed G, and a rapidly-revolving cutter D, stationary in position.

8. The mandrel F, means for revolving the same, a blank upon one end of said mandrel, a rotatable bearing for said mandrel, and a screw $h^2$ for clamping the same and preventing its rotation, substantially as described.

In testimony whereof I have signed my name to this specification in the presence of two subscribing witnesses.

HENRY DAVIDSON.

Witnesses:
MICHAEL HEAM,
PHILIP LLOYD.